(12) United States Patent
Onishi

(10) Patent No.: US 7,458,713 B2
(45) Date of Patent: Dec. 2, 2008

(54) ILLUMINATION DEVICE AND LIGHT GUIDE PLATE

(75) Inventor: Yasunori Onishi, Azumino (JP)

(73) Assignee: Seiko Epson Corporation (JP)

( * ) Notice: Subject to any disclaimer, the term of this patent is extended or adjusted under 35 U.S.C. 154(b) by 31 days.

(21) Appl. No.: 11/287,707

(22) Filed: Nov. 28, 2005

(65) Prior Publication Data

US 2006/0120111 A1    Jun. 8, 2006

(30) Foreign Application Priority Data

Dec. 2, 2004    (JP) .............................. 2004-349441

(51) Int. Cl.
F21V 7/04    (2006.01)

(52) U.S. Cl. .................. 362/626; 362/612; 362/613; 362/615; 362/621; 362/606; 362/607; 362/623; 362/625

(58) Field of Classification Search ............... 362/626, 362/612, 613, 615, 621, 606, 607, 623, 625; 349/65
See application file for complete search history.

(56) References Cited

U.S. PATENT DOCUMENTS

| | | | |
|---|---|---|---|
| 5,592,332 A * | 1/1997 | Nishio et al. ............... 359/619 |
| 6,072,551 A | 6/2000 | Jannson | |
| 6,168,281 B1 * | 1/2001 | Suzuki ....................... 362/619 |
| 6,231,200 B1 | 5/2001 | Shinohara et al. | |
| 6,454,452 B1 | 9/2002 | Sasagawa et al. | |
| 6,474,827 B2 | 11/2002 | Shinohara et al. | |
| 6,518,714 B2 | 2/2003 | Inoue et al. | |
| 6,595,652 B2 | 7/2003 | Oda et al. | |
| 6,921,178 B2 | 7/2005 | Ohkawa | |
| 7,001,035 B2 | 2/2006 | Kawakami | |
| 7,121,709 B2 * | 10/2006 | Shinohara et al. ........... 362/606 |
| 7,226,197 B2 | 6/2007 | Hayashi et al. | |
| 2004/0161222 A1 | 8/2004 | Niida et al. | |
| 2005/0030730 A1 * | 2/2005 | Ohkawa et al. ............... 362/31 |
| 2005/0122745 A1 * | 6/2005 | Sugiura ....................... 362/626 |

FOREIGN PATENT DOCUMENTS

| | | |
|---|---|---|
| JP | 9-113730 | 5/1997 |
| JP | 10-104430 | 4/1998 |
| JP | 11-113907 | 4/1999 |
| JP | 2000-504855 | 4/2000 |
| JP | 2000-305073 | 11/2000 |

(Continued)

OTHER PUBLICATIONS

Examination result issued in corresponding Korean application.

*Primary Examiner*—Stephen F Husar
*Assistant Examiner*—Jessica L McMillan
(74) *Attorney, Agent, or Firm*—Harness, Dickey & Pierce, P.L.C.

(57) ABSTRACT

An illumination device includes a light guide plate having an incident end face and a reflecting surface, and a plurality of light sources provided at the incident end face of the light guide plate. The reflecting surface of the light guide plate has a diffusing pattern for diffusing incident light, the diffusing pattern has a plurality of ridgelines arranged perpendicularly to a propagating direction of the incident light to diffuse the incident light, and the ridgelines are discontinuous in the propagating direction.

9 Claims, 9 Drawing Sheets

FOREIGN PATENT DOCUMENTS

| | | |
|---|---|---|
| JP | 2001-126519 | 5/2001 |
| JP | 2003-043265 | 2/2003 |
| JP | 2003-150073 A | 5/2003 |
| JP | 2003-331629 | 11/2003 |
| JP | 2004-006187 | 1/2004 |
| JP | 2004-6326 | 1/2004 |
| JP | 2004-193051 | 7/2004 |
| JP | 2004-227956 | 8/2004 |
| JP | 2004-319514 A | 11/2004 |
| KR | 2002-0046962 | 7/2002 |
| KR | 2003-19092 A | 3/2003 |
| KR | 10-2003-0044484 | 6/2003 |
| KR | 2004-0074927 | 8/2004 |
| KR | 2004-90070 A | 10/2004 |

* cited by examiner

FIG. 3
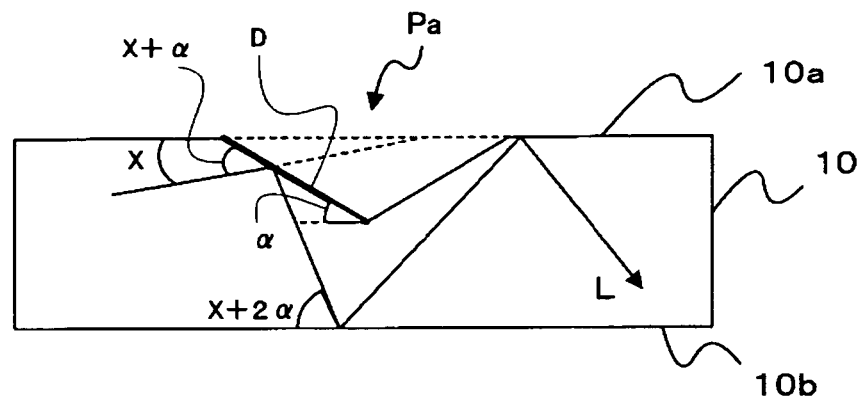
FIG. 3A
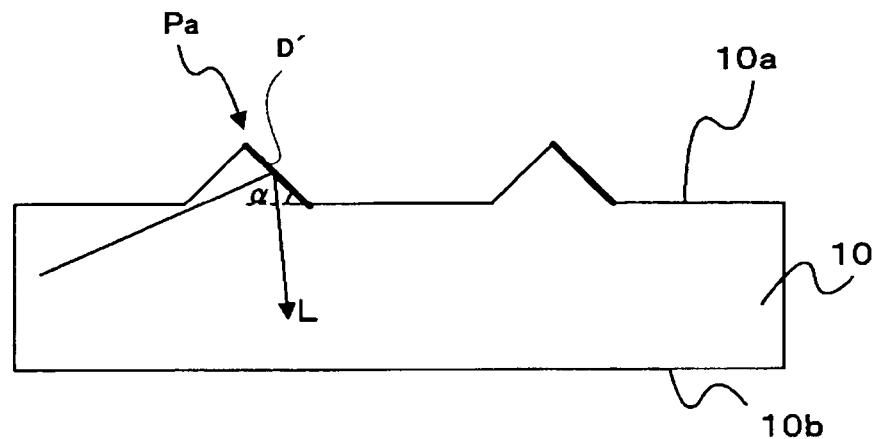
FIG. 3B
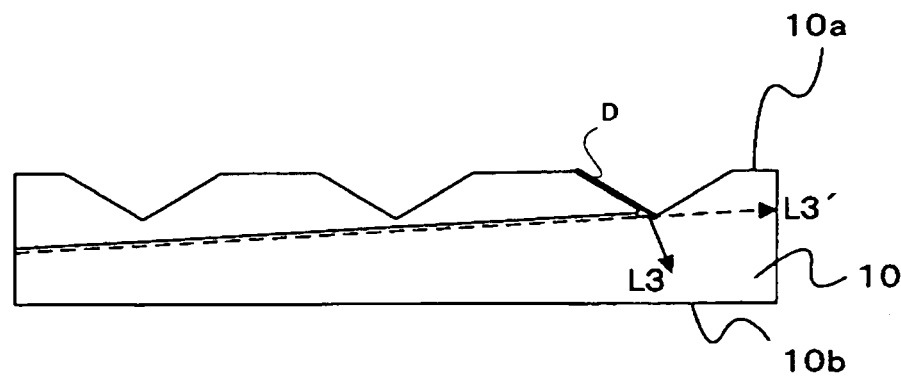
FIG. 3C

ILLUMINATION DEVICE AND LIGHT GUIDE PLATE

BACKGROUND

1. Technical Field

The present invention relates to an illumination device, such as a backlight unit, for use in, for example, a liquid crystal display of a mobile telephone, and to a light guide plate in the illumination device.

2. Related Art

In liquid crystal display devices, a backlight unit is provided on the back side of a liquid crystal display panel to perform transmissive display. In general, the backlight unit is constructed as an illumination device including a light source, a light guide plate for applying light emitted from the light source as planar light onto the back surface of the liquid crystal display panel, a sheet for diffusing the light from the light guide plate, and a prism sheet for collecting the light. When light from the light source enters the light guide plate, it is repetitively reflected between an emergent surface and a reflecting surface of the light guide plate, and finally emerges outside from the emergent surface.

When the light guide plate is a flat plate having a fixed thickness and the emergent surface is a mirror-finished surface, light does not emerge from the emergent surface. Accordingly, JP-T-2000-504855 discloses a light guide plate in which the angle of light is gradually changed every time the light is reflected by a prism-shaped pattern provided on a reflecting surface, and the light finally emerges from an emergent surface when the angle with respect to the emergent surface exceeds the critical angle.

In the above light guide plate, however, when a point light source, such as an LED, is used, luminance nonuniformity is caused because light diffusibility is insufficient. For this reason, the light utilizing efficiency of the light guide plate is not high, and the light-emitting area of the emergent surface is limited.

SUMMARY

An advantage of some aspects of the invention is to increase the amount of display light and suppress luminance nonuniformity by forming appropriate patterns on faces of a light guide plate.

An illumination device according to an aspect of the invention includes a light guide plate having an incident end face and a reflecting surface, and a plurality of light sources provided at the incident end face of the light guide plate. The reflecting surface of the light guide plate has a diffusing pattern for diffusing incident light, the diffusing pattern has a plurality of ridgelines arranged perpendicularly to a propagating direction of the incident light to diffuse the incident light, and the ridgelines are discontinuous in the propagating direction.

For example, the illumination device is suitably used as a backlight unit in a liquid crystal display device. The illumination device includes a plurality of light sources, and a light guide plate having an incident end face on which light from the light sources is incident. As the light sources, for example, LEDs are used. Fine linear grooves discontinuously extend on a reflecting surface in the propagating direction of the light from the light sources to form a diffusing pattern. Light emerging from the reflecting surface is diffused by being refracted by the fine grooves. In this way, the diffusing pattern sufficiently diffuses the incident light perpendicularly to the propagating direction of the light. Consequently, it is possible to suppress luminance nonuniformity due to insufficient light diffusibility.

Preferably, the ridgelines extend along the propagating direction, and are parallel to a side of the light guide plate provided along the propagating direction.

Preferably, a reflection sheet is provided on a side of the reflecting surface of the light guide plate. Light emerges from the reflecting surface when the angle with respect to the reflecting surface exceeds the critical angle, it is reflected by the reflection sheet, and returns into the light guide plate. The light emerging from the reflecting surface is diffused by refraction by the diffusing pattern. Consequently, the light can be diffused more satisfactorily.

Preferably, the light guide plate has an emergent surface, and a plurality of prisms are provided on the emergent surface. For example, the prisms are formed of grooves of substantially inverted triangular cross section. With the prisms, light propagating inside the light guide plate can be efficiently reflected, and the direction of the light can be changed. This increases the amount of light emerging from the emergent surface.

Preferably, a prism sheet is provided on a side of the emergent surface of the light guide plate, and the prisms extend perpendicularly to the propagating direction. When the prisms are provided on the emergent surface so as to be perpendicular to the propagating direction of incident light, the light can enter the prism sheet at an appropriate angle such that the light perpendicularly enters the liquid crystal panel.

Preferably, a prism sheet is provided on a side of the emergent surface of the light guide plate, and the prisms extend parallel to a direction in which the light sources are arranged.

Preferably, a plurality of irregularities of triangular, circular, elliptical, or rectangular cross section are provided on the incident end face from one end to the other end. When light from the light sources passes through the incident end face, it is refracted by the irregularities so as to be diffused in the arrangement direction of the light sources. Therefore, luminance nonuniformity due to insufficient light diffusibility can be suppressed.

Preferably, the diffusing pattern is formed by relief holography, grinding, or hairlining performed to form fine grooves extending perpendicularly to the arrangement direction of the light sources.

An electrooptical device according to another aspect of the invention includes a display panel, and the above illumination device used as a backlight of the display panel. The electrooptical device enhances the utilizing efficiency of light from the light sources, and increases the light-emitting area. An electronic apparatus according to a further aspect of the invention includes the electrooptical device as a display section.

A light guide plate according to a still further aspect of the invention includes an incident end face on which light is incident, an emergent surface from which the light emerges, and a reflecting surface opposing the emergent surface. The reflecting surface has a diffusing pattern for diffusing the light incident on the incident end face, the diffusing pattern has a plurality of ridgelines arranged perpendicularly to a propagating direction of the incident light to diffuse the incident light, and the ridgelines discontinuously extend in the propagating direction. In this case, light that enters the light guide plate can be diffused by the reflecting surface, and luminance nonuniformity due to insufficient light diffusibility can be suppressed.

Preferably, the emergent surface has prisms extending perpendicularly to a direction in which the light is incident on the incident end face. By forming the prisms, light propagating inside the light guide plate can be efficiently reflected, and the direction of the light can be changed. Consequently, the amount of light emerging from the emergent surface is increased.

A production method according to a still further aspect of the invention produces an illumination device including a light guide plate having an incident end face and a reflecting surface, and a plurality of light sources provided at the incident end face of the light guide plate. The production method includes forming fine grooves on the reflecting surface of the light guide plate by relief holography, grinding, or hairlining so that the fine grooves are perpendicular to a direction in which the light sources are arranged.

BRIEF DESCRIPTION OF THE DRAWINGS

The invention will be described with reference to the accompanying drawings, wherein like numbers reference like elements.

FIGS. 3A, 3B, and 3C are enlarged sectional views of the light guide plate.

DESCRIPTION OF EXEMPLARY EMBODIMENTS

Preferred embodiments of the invention will be described below with reference to the drawings.

Configuration of Liquid Crystal Display Device

Figure 1:
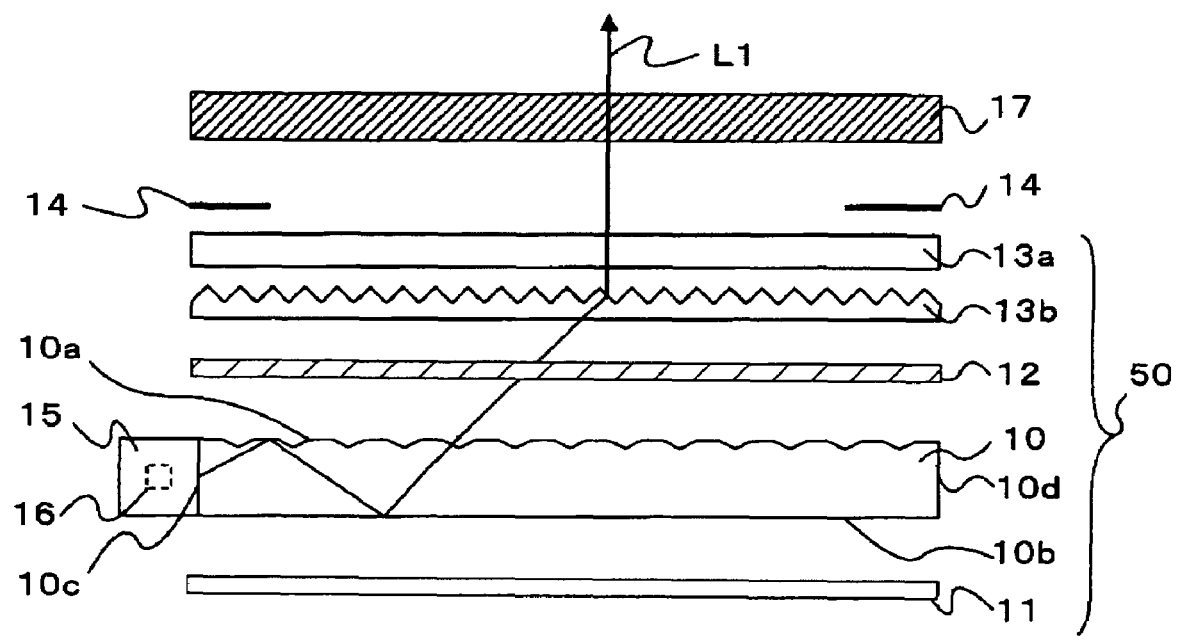
FIG. 1 is a side view showing the general configuration of a liquid crystal display device to which an illumination device according to an embodiment of the invention is applied.

FIG. 1 schematically shows the configuration of a liquid crystal display device to which an illumination device according to an embodiment of the invention is applied. Referring to FIG. 1, an illumination device 50 according to an embodiment of the invention is of a surface-emitting type, and is used as a backlight unit in the liquid crystal display device 100. The illumination device 50 includes a light guide plate 10 having a light source 15 at an end thereof, a reflection sheet 11 disposed on the lower side of the light guide plate 10, and a diffusing sheet 12 and two prism sheets 13a and 13b disposed on the upper side of the light guide plate 10. The illumination device 50 is bonded to a liquid crystal panel 17 with a double-faced tape 14. Light L1 emerging from the light guide plate 10 passes through the diffusing sheet 12 and the prism sheets 13a and 13b, and illuminates the liquid crystal panel 17 from the back side, as shown in FIG. 1. This allows the liquid crystal display device 100 to perform transmissive display.

The light source 15 includes, for example, a plurality of LEDs 16 serving as point light sources, and emits light toward an end face 10c of the light guide plate 10 opposed thereto (hereinafter referred to as an "incident end face"). The light guide plate 10 is rectangular in plan view, and is made of a transparent resin such as acrylic resin. The light guide plate 10 has an upper surface 10a from which light is emitted (hereinafter referred to as an "emergent surface"), and a lower surface 10b that reflects light (hereinafter referred to as a "reflecting surface").

When light L1 is emitted from the light source 15, it enters the light guide plate 10 through the incident end face 10c, and is repetitively reflected between the emergent surface 10a and the reflecting surface 10b. When the angle with respect to the emergent surface 10a exceeds the critical angle, the light L1 emerges outside through the emergent surface 10a.

The diffusing sheet 12 diffuses the light L1 emerging from the light guide plate 10 so that brightness in a light-emitting plane of the illumination device 100 is uniform. Each of the prism sheets 13a and 13b has, on one surface, irregularities of substantially triangular cross section, and efficiently directs light emerging from the emergent surface 10a of the light guide plate 10 toward the liquid crystal panel 17. Prism ridges of the prism sheet 13a are perpendicular to prism ridges of the prism sheet 13b. The reflection sheet 11 reflects light emerging from the reflecting surface 10b of the light guide plate 10 to return the light into the light guide plate 10. The liquid crystal display device to which the invention is applicable is not limited to the liquid crystal display device 100 in this embodiment. Furthermore, the number and positions of the prism sheets and diffusing sheet are not limited to those in the embodiment.

Shape of Emergent Surface of Light Guide Plate

Figure 2A:
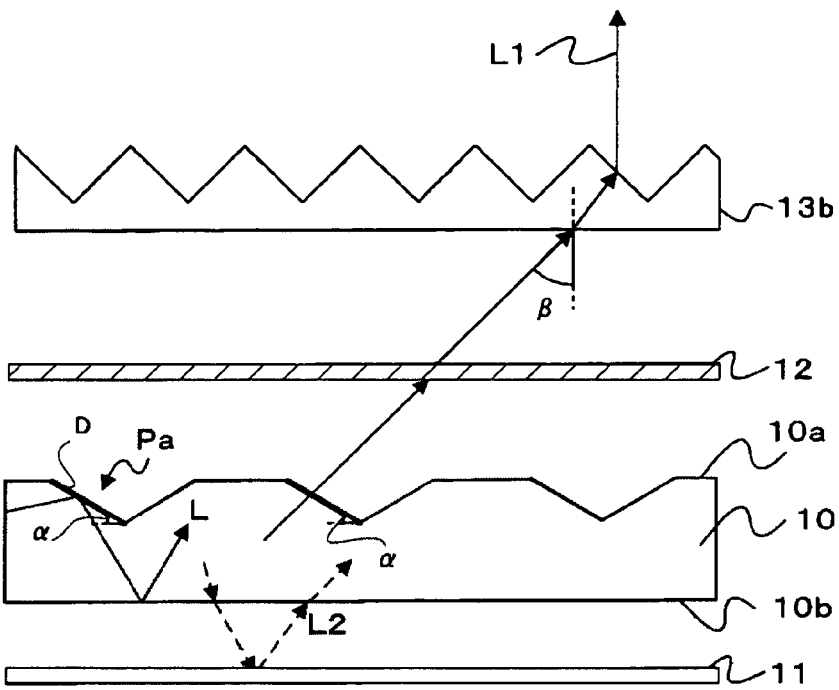
FIG. 2A is a side view showing the path of light in the liquid crystal display device.
Figure 2B:
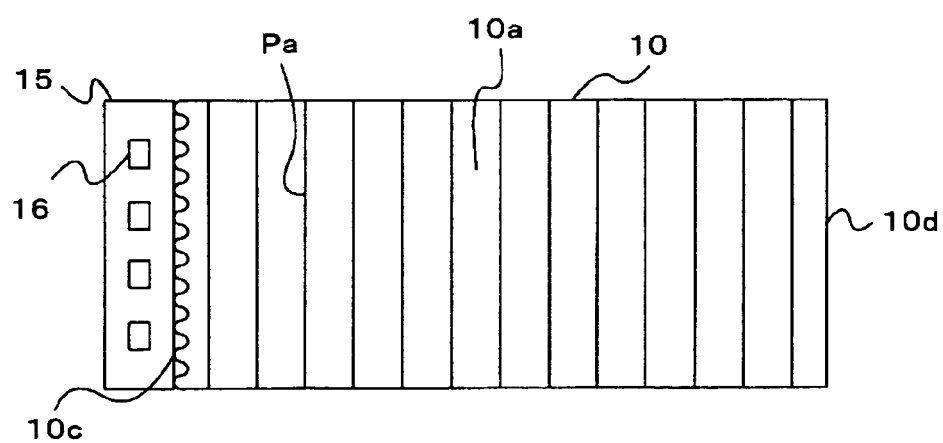
FIG. 2B is a plan view of a light guide panel in the liquid crystal display device.

The path of light in the light guide plate 10 will now be described in detail. FIG. 2A is a side view showing the path of light in the light guide plate 10, and FIG. 2B is a plan view of the light guide plate 10, as viewed from the side of the emergent surface 10a. The light guide plate 10 has a prism-shaped pattern Pa on the emergent surface 10a. The prism-shaped pattern Pa is defined by grooves of substantially inverted triangular cross section, as shown in FIG. 2A. Trough lines of the grooves in the prism-shaped pattern Pa are parallel to the direction in which the LEDs 16 are arranged, as shown in FIG. 2B. Of two faces orthogonally disposed to form each groove, a face opposing light from the light source 15 serves as an effective reflecting face D. The effective reflecting face D lies at an inclination angle $\alpha$ to the emergent surface 10a.

FIG. 3A is an enlarged partial view of the light guide plate 10 shown in FIG. 2A, and shows how light L incident on the incident end face 10c is reflected by the emergent surface 10a and the reflecting surface 10b. As shown in FIG. 3A, when light L is emitted from a plurality of LEDs 16 in the light source 15 and enters the light guide plate 10 through the incident end face 10c, it is repetitively reflected between the emergent surface 10a and the reflecting surface 10b. Since the emergent surface 10a and the reflecting surface 10b are parallel to each other outside the grooves of the pattern Pa, the light L is totally reflected by both the surfaces 10a and 10b so that the incident angle and the reflection angle are the same. However, when the light L is incident on the effective reflecting face D at an angle X and is totally reflected therefrom, the incident angle is $X+\alpha$ because the effective reflecting face D is at an angle $\alpha$ to the emergent surface 10a. When it is assumed that the light L is totally reflected by the effective reflecting face D, the angle of incidence on the reflecting face 10b is $X+2\alpha$. Accordingly, the angle of the light L increases by 2α every time the light L is reflected by the effective reflecting face D. When the incident angle thus increases and the angle with respect to the emergent surface 10a or the reflecting surface 10b exceeds the critical angle, the light L emerges outside through the emergent surface 10a or the reflecting surface 10b. In FIG. 2A, L1 represents a light component of the light L that emerges from the emergent surface 10a when the angle with respect to the emergent surface 10a exceeds the critical angle, and L2 represents a light component that emerges from the reflecting surface 10b when the angle with respect to the reflecting surface 10b exceeds the critical angle.

Since the light component L1 emerges from the emergent surface 10a, as described above, it can enter the liquid crystal panel 17 via the diffusing sheet 12 and the prism sheets 13a and 13b. In order for the light component L1 to substantially perpendicularly emerge from the prism sheets 13a and 13b toward the liquid crystal panel 17, it is preferable that the light component L1 enter the prism sheet 13b at an incident angle β of approximately 60°. Therefore, the above-described inclination angle α of the effective reflecting face D is preferably set to be larger than 20° and smaller than 40°, and most preferably, set at 25°.

When the light guide plate is flat and does not have such a pattern, light incident on the incident end face is repetitively subjected to total reflection between the emergent surface and the reflecting surface, and emerges from an end face opposite to the incident end face. This causes heavy loss of light. Although such a rectangular light guide plate normally has a reflection sheet at the opposite end face, loss of light energy cannot be suppressed by reflection with the reflection sheet. In the light guide plate 10 in the embodiment of the invention, the emergent surface 10a has the above-described prism pattern, and this can change the direction of light reflected by the emergent surface 10a. Consequently, it is possible to suppress loss of light due to light leakage from the opposite end face (end face 10d in the embodiment).

In the flat light guide plate having no pattern, light loss also occurs when light incident on the incident end face leaks from the opposite end face without being totally reflected between the emergent surface and the reflecting surface. In this case, light L3' takes a path shown by a broken line in FIG. 3C. In the embodiment of the invention, since the light guide plate 10 has a prism pattern on the emergent surface 10a, light can be reflected by the effective reflecting faces D to change its direction as long as the effective reflecting faces D lie in the path of the light. In this way, it is possible to reduce light loss caused when light leaks from the opposite end face without being totally reflected.

FIG. 3B shows another example of a shape of the emergent surface 10a of the light guide plate 10. The emergent surface 10a has a prism pattern Pa including projections of substantially triangular cross section. In this case, the incident angle of light L can be increased by effective reflecting faces D', in a manner similar to that in the above-described case in which the emergent surface 10a has grooves of substantially triangular cross section, as shown in FIG. 3A.

The prism pattern Pa of the emergent surface 10a shown in FIG. 3A includes grooves. When the light guide plate 10 is formed by pouring molten resin into a mold, grooves can be more easily formed than projections that are prone to formation failure. Therefore, the pattern including the grooves of substantially inverted triangular cross section allows the light guide plate to be formed easily and precisely.

Shape of Reflecting Surface of Light Guide Plate

The path of a light component L2 will now be described. Since the light component L2 emerges from the reflecting surface 10b, as shown in FIG. 2A, it does not enter the liquid crystal panel 17. In this case, the amount of light for illuminating the liquid crystal panel 17 is reduced by the light component L2 emerging from the reflecting surface 10b. Accordingly, the light component L2 emerging from the reflecting surface 10b is normally reflected and returned into the light guide plate 10 by the reflection sheet 11 disposed on the lower side of the light guide plate 10. After returning in the light guide plate 10, the light component L2 takes a path similar to that of the light component L1, and emerges from the emergent surface 10a. By thus returning the light component L2 emerging from the reflecting surface 10b into the light guide plate 10 by the reflection sheet 11, the ratio of the amount of light emerging from the emergent surface 10a to the amount of light incident on the light guide plate 10 is restrained from falling.

When the reflecting surface 10b is a mirror-finished surface, light diffusibility, particularly, in the direction parallel to the incident end face 10c is prone to be insufficient. More specifically, when point light sources, such as LEDs 16, are used as the light source 15, it is light in front of the LEDs 16, and is dark between the LEDs 16. Consequently, brightness nonuniformity called as a "hot-spot phenomenon", that is, luminance nonuniformity occurs.

Figure 4:
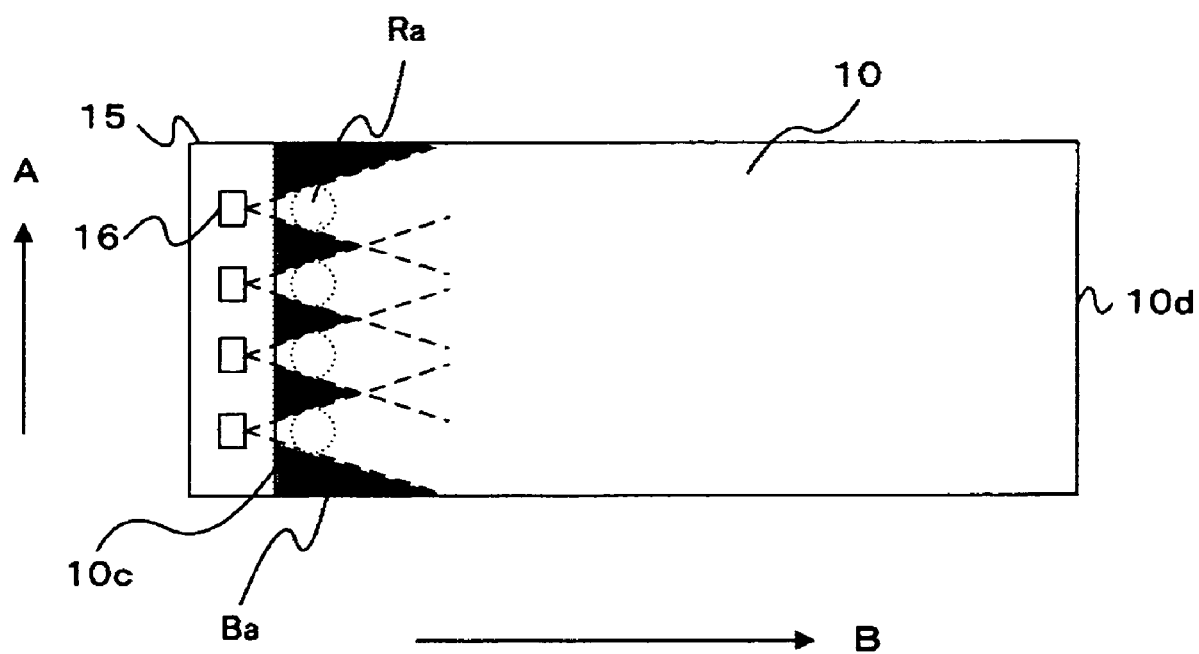
FIG. 4 is a plan view of a known illumination device.

FIG. 4 is a plan view schematically showing the brightness of the light guide plate 10 using the light source 15 having a plurality of LEDs 16. In FIG. 4, the light source 15 includes four LEDs 16 arranged in the longitudinal direction thereof. Since the LEDs 16 emit light toward the incident end face 10c of the light guide plate 10, light regions (hot spots) Ra are formed near the incident end face 10c, and dark regions Ba are formed between the light regions Ra. Since light from the LEDs 16 travels in the longitudinal direction of the light guide plate 10, that is, from the incident end face 10c toward the opposite end face 10d, such luminance nonuniformity is rarely caused in the longitudinal direction (direction B). However, when the reflecting surface 10b is a mirror-finished surface, light diffusibility is low in the lateral direction of the light guide plate 10 (direction A), that is, in the direction in which the LEDs 16 are arranged, and luminance nonuniformity is prone to occur. Normally, the luminance nonuniformity is suppressed by imparting a light-shielding function to the above-described double-faced tape 14.

Figure 5A:
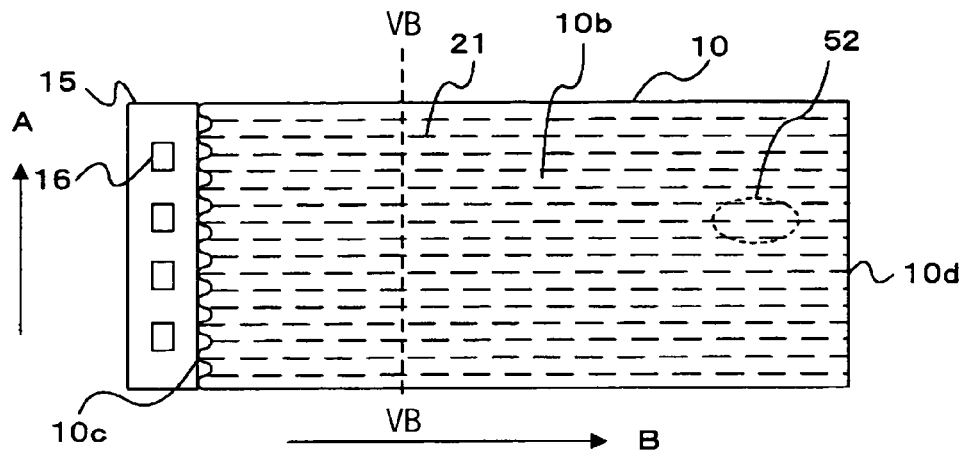
FIGS. 5A to 5D are plan and sectional views of a reflecting surface of the light guide plate.

In the light guide plate 10 of this embodiment, light is diffused and luminance nonuniformity is suppressed by forming a diffusing pattern on the reflecting surface 10b. FIG. 5A is a plan view of the light guide plate 10, as viewed from the side of the reflecting surface 10b. As shown in FIG. 5A, a plurality of small pits 21 are provided in stripes on the reflecting surface 10b to form a diffusing pattern. The pits 21 are substantially parallel to the longitudinal direction B of the light guide plate 10, that is, to the direction substantially perpendicular to the incident end face 10c. Moreover, the pits 21 are provided along almost the entire width (direction A) of the light guide plate 10.

Figure 5B:
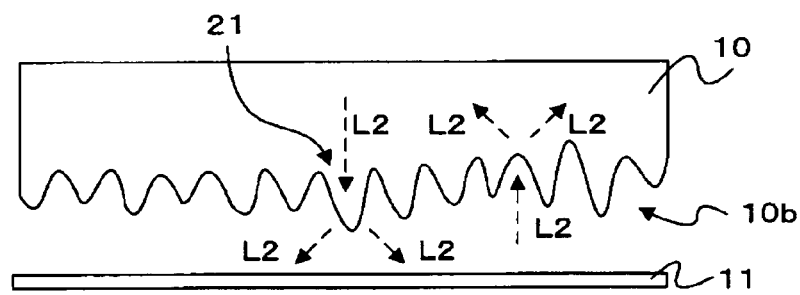

FIG. 5B is a cross-sectional view of the light guide plate 10, taken along line VB-VB in FIG. 5A. As shown in FIG. 5B, it is unnecessary that all the pits 21 constituting the diffusing pattern have the same shape. If anything, it is preferable that the pits 21 have random or different shapes in order to enhance light diffusibility. By thus forming a diffusing pattern by the small pits 21 arranged in stripes in the longitudinal direction of the light guide plate 10, a light component L2 incident from the light source 15 on the light guide plate 10 can be diffused by the reflecting surface 10b, and emerges therefrom in the direction A parallel to the incident end face 10c (that is, the direction in which the LEDs 16 are arranged), as shown in FIG. 5B. The diffused light component L2 is totally reflected by the reflection sheet 11, and enters the light guide plate 10 again through the reflecting surface 10b. The light component L2 is diffused again by the pits 21 when entering the light guide plate 10. That is, the light component L2 can be diffused by the pits 21 twice, when it emerges from the reflecting surface 10b and when it enters the light guide plate 10 again after reflection. Furthermore, when the light component L2 emerges from the reflecting surface 10b or enters the reflecting surface 10b, a fixed part thereof is reflected by the reflecting surface 10b itself. In this case, the reflected light is also diffused by the diffusing pattern. For the above reason, diffusibility in the width direction of the light guide plate 10 can be enhanced and luminance nonuniformity can be prevented by forming a plurality of fine pits 21 in stripes as a diffusing pattern on the reflecting surface 10b.

Figure 5C:
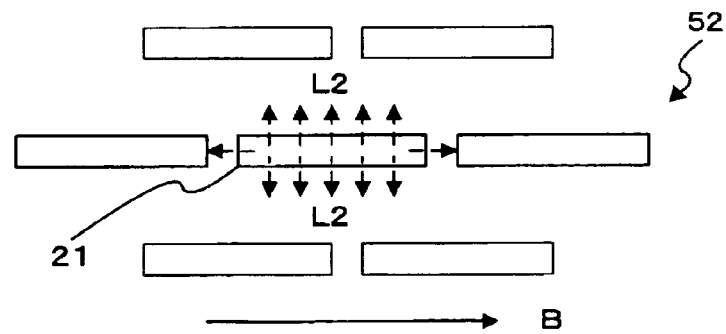

It is more preferable to intermittently arrange the pits 21 like broken lines, as shown in FIG. 5A, than to form the pits 21 in the shape of straight long lines. FIG. 5C is an enlarged view of a part 52 of the reflecting surface 10b shown in FIG. 5A. When the diffusing pattern is constituted by pits 21 arranged in broken lines, as shown in FIG. 5C, light can be diffused in the longitudinal direction B to some extent, and the amount of light to be diffused can be increased as a whole.

Figure 5D:
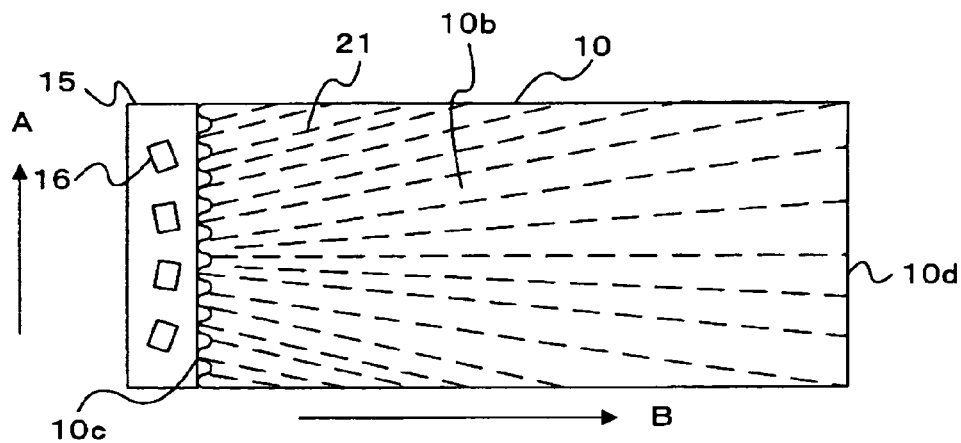

It is not always necessary that the diffusing pattern should be parallel to the longitudinal direction B, as shown in FIG. 5A. FIG. 5D shows a modification of a diffusing pattern of the light guide plate 10. When the diffusing pattern extends in the direction in which light propagates, it can achieve the above-described light diffusing effect. Accordingly, when the LEDs 16 are not parallel, as shown in FIG. 5D, a diffusing pattern is formed in the propagating direction of light emitted from the LEDs 16, that is, parallel to the propagating direction.

In actuality, the diffusing pattern including the fine pits 21 is formed by roughening the reflecting surface 10b of the light guide plate 10, but a special pattern is not formed on the reflecting surface 10b. Therefore, this has little influence on production cost and time, and does not reduce flatness of the light guide plate 10.

As described above, in the embodiment of the invention, the prism pattern is provided on the emergent surface 10a of the light guide plate 10 so as to be parallel to the direction in which the LEDs 16 are arranged. The prism pattern can change the direction of light that enters the light guide plate 10 through the incident end face 10c. Consequently, light emerging from the light guide plate 10 can enter the prism sheet 13b at an adequate angle. Moreover, such a prism-shaped pattern reduces light loss due to light leakage from the end face 10d opposite the incident end face 10c. In addition, when the diffusing pattern including the pits 21 is provided on the reflecting surface 10b perpendicularly to the arrangement direction of the LEDs 16, incident light can be sufficiently diffused parallel to the arrangement direction, and luminance nonuniformity can be suppressed.

Shape of Incident End Face of Light Guide Plate

A description will now be given of the incident end face 10c of the light guide plate 10. In this embodiment, the incident end face 10c is also processed in a way to diffuse light incident thereon from the LEDs 16 in order to further suppress luminance nonuniformity.

Figure 6A:
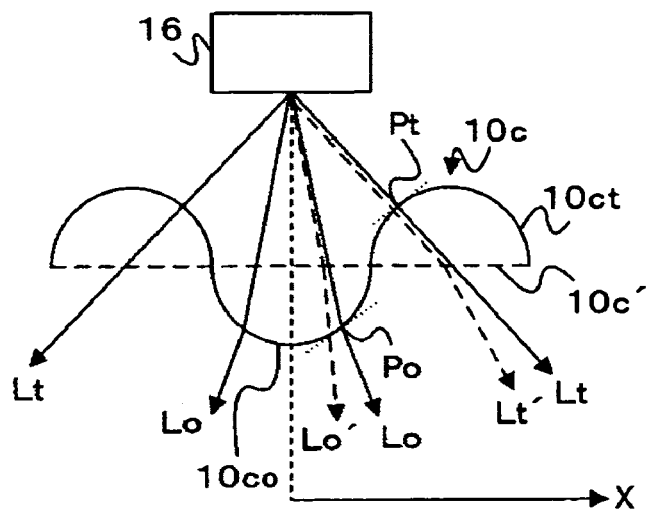
FIGS. 6A to 6D are plan views of an incident end face of the light guide plate.

FIGS. 6A to 6D are enlarged views of the incident end face 10c, as viewed from the side of the emergent surface or the reflecting surface. FIG. 6A shows an example of the incident end face 10c. The incident end face 10c has a corrugated shape defined by convex semicircular portions 10ct and concave semicircular portions 10co arranged alternately. Light L emitted from an LED 16 serving as a point light source is also diffused before it enters the incident end face 10c. In FIG. 6A, Lt represents light beams incident on the convex semicircular portions 10ct, of the diffused light L incident on the incident end face 10c, and Lo represents light beams incident on the concave semicircular portions 10co. Pt represents the points at which the light beams Lt are incident on the incident end face 10c, and Po represents the points at which the light beams Lo are incident on the incident end face 10c. For comparison, a virtual shape of a simply flat incident end face 10c' is shown by a broken line. Lt' represents light beams incident on the incident end face 10c' in the same direction as that of the light beams Lt, and Lo' represents light beams incident thereon in the same direction as that of the light beams Lo. As shown in FIG. 6A, light is diffused from a light-emitting portion of the LED 16 in the X-direction.

When light beams Lt' and Lo' enter the incident end face 10c', they are refracted thereat, thereby changing the directions thereof. The light beams Lt' and Lo' are not diffused because the directions are changed in the −X-direction. In contrast, when light beams Lt and Lo enter the incident end face 10c, they are refracted by tangent surfaces to the incident end face 10c at the incident points Pt and Po. Since the tangent surfaces are inclined toward the LED 16 relative to the incident end face 10c', the directions of refracted light beams are changed in the +X-direction, that is, in the light diffusing direction. Therefore, light that is emitted from the LED 16 and is incident on the incident end face 10c can be diffused in the X-direction by corrugating the incident end face 10c.

Figure 6B:
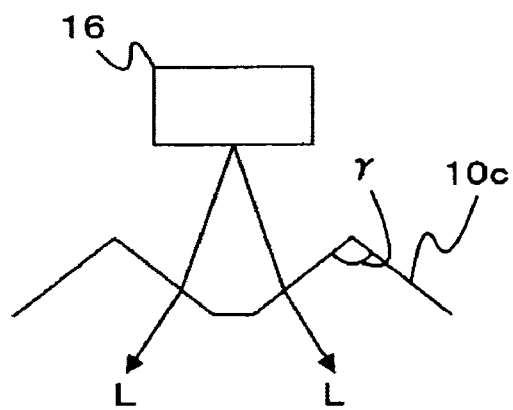

FIG. 6B shows an incident end face 10c as another example. The incident end face 10c has a pattern defined by substantially triangular projections. The vertex angle of the projections is designated as γ. Inclined faces of the projections are inclined toward the LED 16, similarly to the tangent surfaces shown in FIG. 6A, unlike the simply flat incident end face 10c' shown in FIG. 6A. The direction of incident light L can be changed in the light diffusing direction by refraction at the inclined faces. Preferably, the vertex angle γ is set to be larger than 90° and smaller than 140°.

Figure 6C:
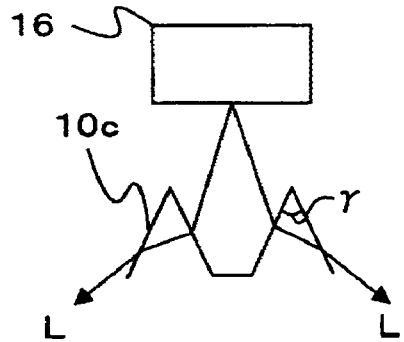

FIG. 6C shows a case in which the vertex angle γ of the projections shown in FIG. 6B is smaller than 90°. In this case, since the space between the inclined faces of the substantially triangular projections is small, light L emerges outside from opposite inclined faces, and this causes light loss. Conversely, when the vertex angle γ is larger than 140°, the light diffusing effect is lessened. Accordingly, it is preferable that the vertex angle γ be larger than 90° and smaller than 140°.

Figure 6D:
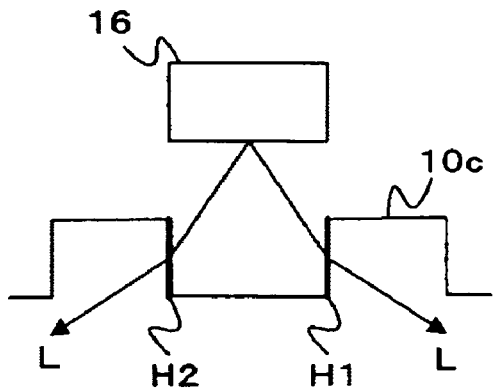

FIG. 6D shows an incident end face 10c as a further example. The incident end face 10c has a pattern defined by substantially rectangular projections. Faces H1 and H2 of the projections are substantially perpendicular to the virtual flat incident end face 10c' shown in FIG. 6A. Therefore, incident light L is refracted by the faces H1 and H2, and the direction thereof is changed in the light diffusing direction.

As described above, light can be diffused in the arrangement direction of the LEDs 16 when it is refracted by the incident end face 10c shaped as shown in FIG. 6A, 6B, or 6D. By thus forming a plurality of irregularities of triangular, circular, elliptical, or rectangular cross section on the incident end face 10c in the thickness direction of the light guide plate 10, it is also possible to diffuse light and to suppress luminance nonuniformity.

Since the utilizing efficiency of light from the LEDs can be enhanced by forming predetermined patterns on the emergent surface, the reflecting surface, and the incident end face, the number of LEDs used in the light source can be reduced, as necessary. Furthermore, since light can be diffused by forming predetermined patterns on the reflecting surface and the incident end face, luminance nonuniformity is suppressed. In this case, the double-faced tape does not need to have a light shielding function, and therefore, the light-emitting area of the emergent surface of the light guide plate can be increased.

Modification

Figure 7:
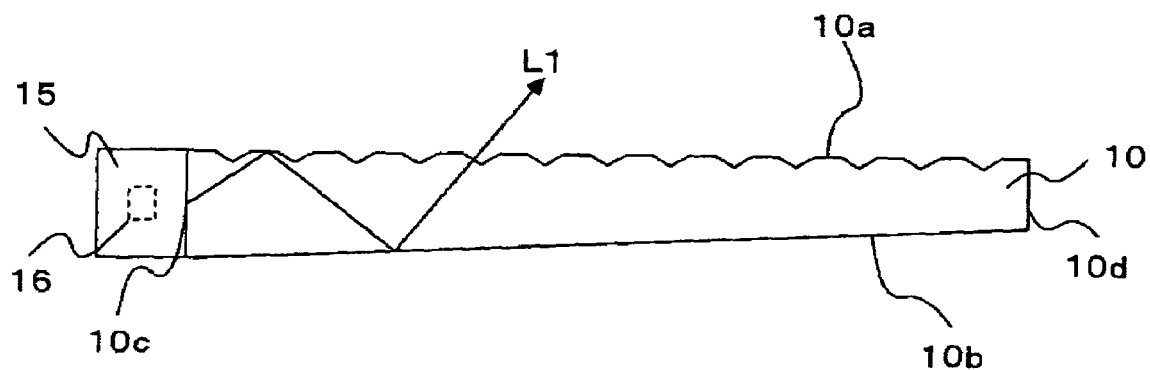
FIG. 7 is an explanatory view of a modification of the light guide plate.

While luminance nonuniformity is reduced and light is efficiently emitted from the emergent surface by shaping the incident end face, the emergent surface, and the reflecting surface of the rectangular light guide plate in the above-described embodiment, the shape of the light guide plate in the invention is not limited to that in the embodiment. For example, the light guide plate may be wedge-shaped, as shown in FIG. 7. By similarly shaping an incident end face, an emergent surface, and a reflecting surface of the wedge-shaped light wave guide, luminance nonuniformity can be suppressed and light can be efficiently emitted from the emergent surface, in a manner similar to that in the rectangular light guide plate in the above embodiment.

Production Method for Light Guide Plate

Figure 8:
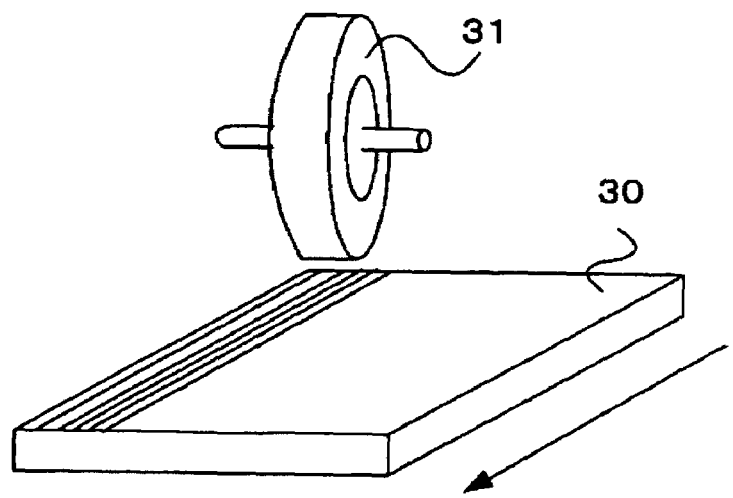
FIG. 8 is an explanatory view showing grinding of a mold used to produce the light guide plate.

A production method for the light guide plate 10 will now be described. The above-described diffusing pattern on the reflecting surface 10*b* is formed, for example, by performing molding or injection molding of a light guide plate with a mold having fine irregularities formed by grinding. Grinding is suited to form fine grooves in stripes, and grooves can be easily and precisely formed with a grinder. More specifically, as schematically shown in FIG. 8, a mold 30 is placed in contact with a rotating circular grinder 31, and is moved so that the surface thereof is ground. Thereby, fine grooves are formed in stripes on the mold 30. Instead of grinding, a plurality of fine pits that constitute the diffusing pattern may be formed by relief holography that forms irregularities by laser beam machining, or hairlining that forms long linear irregularities like hairs by pressing an abrasive cloth or the like against a metal surface while rotating the abrasive cloth at high speed.

Figure 9A:
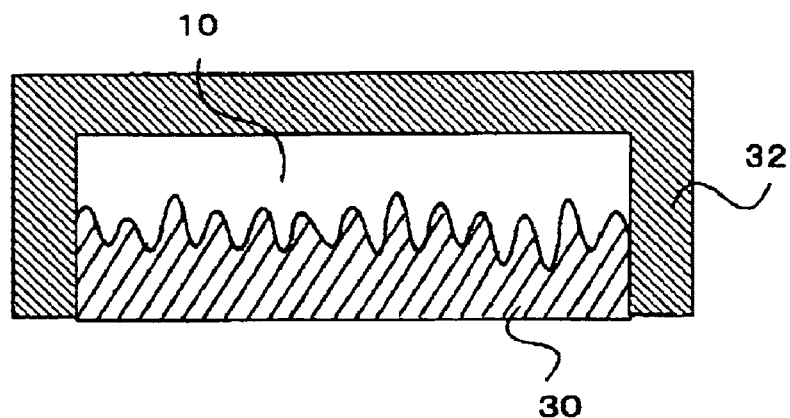
FIGS. 9A and 9B are explanatory views showing a production method for the light guide plate.
Figure 9B:
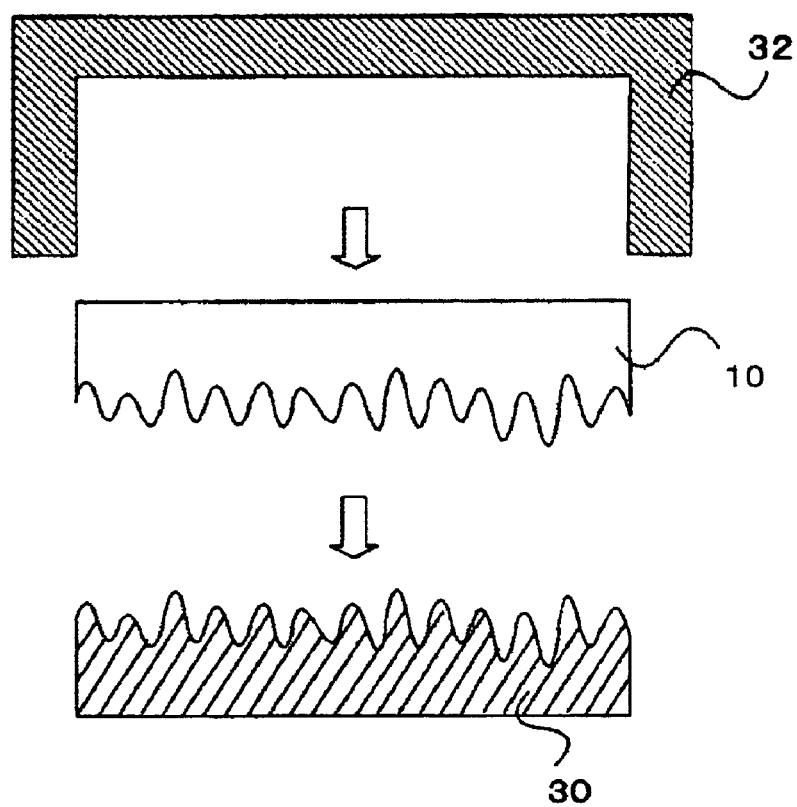

FIGS. 9A and 9B schematically show a method for producing a light guide plate by using a mold made in the above-described manner. As shown in FIG. 9A, resin is sealed by, for example, by ejection between a mold 30 on which irregularities are formed in stripes by grinding, and a mating mold 32 with an emergent surface and an incident end face each having a predetermined pattern. After the resin sets to form a light guide plate 10, the molds 30 and 32 are separated, and the light guide plate 10 is taken out. In the light guide plate 10 produced in this way, a plurality of pits 21 are provided in stripes as a diffusing pattern on a reflecting surface 10*b*, and patterns are provided on an emergent surface 10*a* and an incident end face 10*c*.

Electronic Apparatuses

Specific examples of electronic apparatuses to which the liquid crystal display device 100 of the embodiment of the invention is applicable will be described with reference to FIGS. 10A and 10B.

First, a description will be given of a portable personal computer (so-called notebook personal computer) 710 in which the liquid crystal display device 100 is applied as a display section. FIG. 10A is a perspective view showing the configuration of the personal computer 710. As shown in FIG. 10A, the personal computer 710 includes a main unit 712 having a keyboard 711, and a display unit 713 to which the liquid crystal display device 100 is applied.

A description will now be given of a mobile telephone 720 in which the liquid crystal display device 100 is applied as a display section. FIG. 10B is a perspective view showing the configuration of the mobile telephone 720. As shown in FIG. 10B, the mobile telephone 720 includes a plurality of control buttons 721, an earpiece 722, a mouthpiece 723, and a display 724 to which the liquid crystal display device 100 is applied.

Figure 10A:
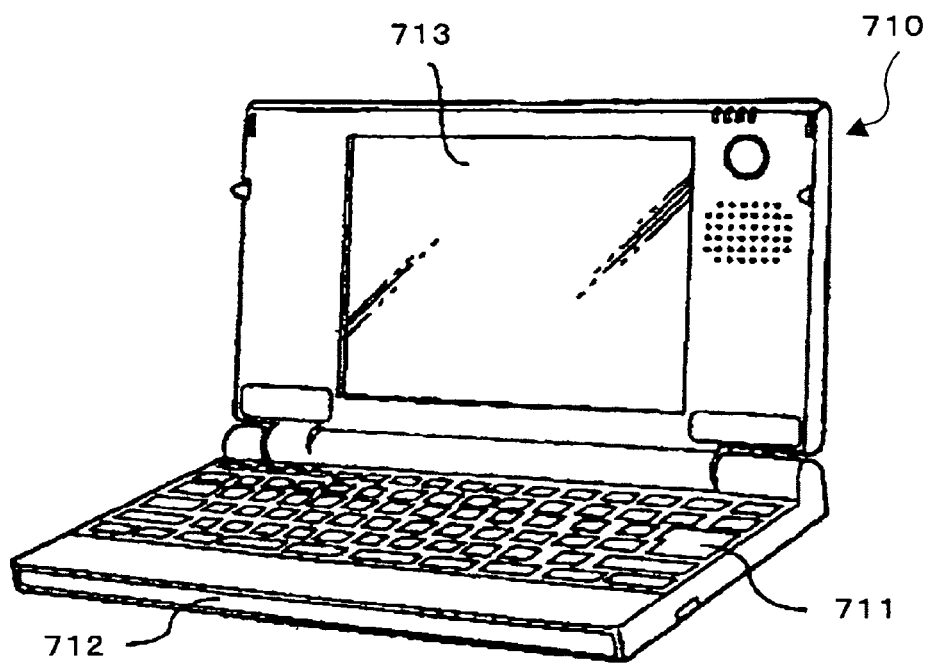
FIGS. 10A and 10B are schematic views of electronic devices to which the illumination device according to the embodiment of the invention is applied.
Figure 10B:
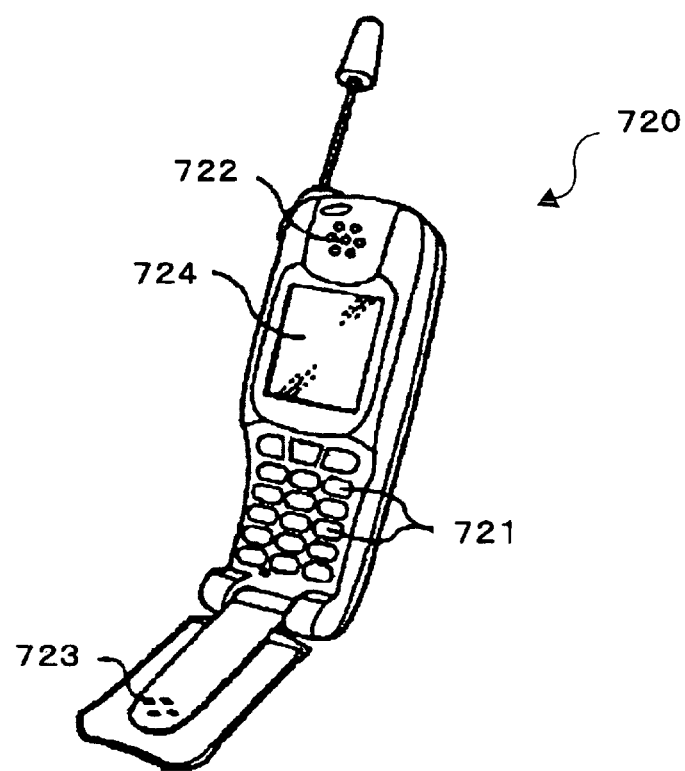

Besides the personal computer 710 shown in FIG. 10A and the mobile telephone 720 shown in FIG. 10B, the liquid crystal display device 100 according to the embodiment of the invention may be applied to various electronic apparatuses such as a liquid crystal television, view-finder and direct-monitor-view video tape recorders, a car navigation system, a pager, an electronic notebook, an electronic desk calculator, a word processor, a workstation, a videophone, a POS terminal, and a digital still camera.

What is claimed is:

1. An illumination device comprising:
    a light guide plate having:
        an incident end face;
        an end face opposite the incident end face;
        an emergent surface extending from the incident end face to the end face; and
        a reflecting surface opposite the emergent surface and extending from the incident end face to the end face; and
    at least one light source provided at the incident end face of the light guide plate;
    the reflecting surface of the light guide plate including at least one of:
        concave portions arranged in rows juxtaposed to one another in a first direction parallel to the incident end face, each of the concave portions being elongated in a second direction that is perpendicular to the incident end face, concave portions in the same row being spaced apart from each other in the second direction, concave portions in adjacent rows being offset from each other in the second direction; and
        convex portions arranged in rows juxtaposed to one another in a first direction parallel to the incident end face, each of the convex portions being elongated in a second direction that is perpendicular to the incident end face, convex portions in the same row being spaced apart from each other in the second direction, convex portions in adjacent rows being offset from each other in the second direction.

2. The illumination device according to claim 1, wherein the at least one of the plurality of concave portions and the plurality of convex portions are parallel to a side of the light guide plate provided between the incident end face and the end face.

3. The illumination device according to claim 1, wherein a reflection sheet is provided on a side of the reflecting surface of the light guide plate.

4. The illumination device according to claim 1, wherein a plurality of prisms are provided on the emergent surface of the light guide plate.

5. The illumination device according to claim 4, wherein a prism sheet is provided on a side of the emergent surface of the light guide plate, and the prisms extend parallel relative to the incident end face.

6. The illumination device according to claim 1, wherein a plurality of irregularities of triangular, circular, elliptical, or rectangular cross section are provided on the incident end face from one end to the other end in a thickness direction of the light guide plate.

7. The illumination device according to claim 1, wherein the at least one of the plurality of concave portions and the plurality of convex portions is formed by relief holography, grinding, or hairlining to form fine grooves.

8. The light guide plate according to claim 1, wherein the at least one of the plurality of concave portions and the plurality of convex portions further comprises a plurality of portions having different shapes to enhance light diffusibility.

9. The illumination device according to claim 1, the emergent surface of the light guide plate including at least one of:
- a plurality of axially spaced apart and linearly elongated concave portions arranged along a plurality of laterally spaced apart axes extending generally parallel relative to the incident end face; and
- a plurality of axially spaced apart and linearly elongated convex portions arranged along a plurality of laterally spaced apart axes extending generally parallel relative to the incident end face.

* * * * *